(12) United States Patent
Nakata et al.

(10) Patent No.: US 6,348,123 B1
(45) Date of Patent: Feb. 19, 2002

(54) METHOD FOR ADHERING POLYOLEFIN MATERIALS

(75) Inventors: Yoshihiro Nakata; Shinji Ochi, both of Takatsuki (JP)

(73) Assignee: Sunstar Giken Kabushiki Kaisha, Takatsuki (JP)

( * ) Notice: Subject to any disclaimer, the term of this patent is extended or adjusted under 35 U.S.C. 154(b) by 0 days.

(21) Appl. No.: 09/377,774

(22) Filed: Aug. 20, 1999

(30) Foreign Application Priority Data

Aug. 21, 1998 (JP) ............................................ 10-235436

(51) Int. Cl.[7] .................................................. C09J 5/02
(52) U.S. Cl. ........................ 156/322; 156/71; 156/108; 156/331.7
(58) Field of Search ................................ 156/242, 281, 156/71, 108, 322, 331.7; 525/102, 105, 123, 453, 454, 455, 457, 458; 528/59, 60, 61

(56) References Cited

U.S. PATENT DOCUMENTS 5,180,766 A * 1/1993 Hayama et al. ............. 525/315
5,223,575 A * 6/1993 Mori et al. .................. 525/102

FOREIGN PATENT DOCUMENTS

| JP | 62004728 A | 1/1987 |
| JP | 62-95326 A | 5/1987 |

* cited by examiner

*Primary Examiner*—Richard Crispino
*Assistant Examiner*—Cheryl N. Hawkins
(74) *Attorney, Agent, or Firm*—Jocobson Holman, PLLC

(57) ABSTRACT

A polyolefin material can be adhered to other material with good adhesion durability by 1) applying a first primer which contains i) a resin comprising a backbone of hydrocarbon chains and/or polybutadiene chains, and ii) a polyisocyanate compound or an alkoxysilane compound, to the surface of a polyolefin material, 2) applying a second primer which contains a polyisocyanate compound or an alkoxysilane compounds, onto the layer of the first primer, and 3) adhering the surface of the polyolefin material to which the first and second primers are applied to other material using a moisture-curing polyurethane adhesive.

5 Claims, No Drawings

METHOD FOR ADHERING POLYOLEFIN MATERIALS

BACKGROUND OF THE INVENTION

1. Field of the Invention

The present invention relates to a method for adhering polyolefin materials. In particular, the present invention relates to a method for adhering polyolefin materials, for example, adhering an automobile window glass to a window molding made of a polyolefin material with a moisture-curing polyurethane adhesive, in which two kinds of specific primers are successively applied onto the polyolefin material prior to the application of an adhesive, whereby adhesion properties, in particular, the durability of adhesion, are improved, and a working life after the application of the two primers can be extended. Here, a "working life" is intended to mean a maximum time in which a primer can maintain its priming properties after the application.

2. Prior Art

A moisture-curing polyurethane adhesive is generally used to adhere automobile window glass to the flange of an automobile body. Such an adhesive is applied to the periphery of a window glass, and then the glass is mounted in and pressed to the flange of a body. Thus, the window glass is adhered and mounted to the flange. In general, a window molding is inserted between the flange of a body and a window glass to shield and protect a gap or a step between them, and adhered and fixed at the same time as the mounting of the window glass.

Such window moldings are often made of hard or soft polyvinyl chloride resins. However, in these years, it has been discussed to replace polyvinyl chloride resins with recyclable polyolefin resins to keep up with the social demands on environmental protection, for example, recycling and disposal of materials constructing automobiles. As one measure to replace polyvinyl chloride resins with polyolefin resins, it is desired to develop a new method to adhere the flanges of automobile bodies and window moldings made of polyolefin resins.

As a primer for polyolefin resins, JP-A-62-95326 proposes hydrogenated polybutadiene base primers, for example, a reaction product having an active isocyanate group which is obtained by reacting a hydrogenated polybutadiene glycol with an excessive amount of a polyisocyanate component. However, such a primer cannot achieve the sufficient durability of adhesion, or a long working life after the application of the primer.

SUMMARY OF THE INVENTION

One object of the present invention is to provide a method for the adhesion of a polyolefin material to other material, for example, the adhesion of a window molding made of a polyolefin resin to a window glass, using an adhesive, in particular a moisture-curing polyurethane adhesive.

Another object of the present invention is to provide a method for the adhesion of a polyolefin material to other material, which method achieves the improved durability of adhesion, and a prolonged working life after the application of a primer.

Accordingly, the present invention provides a method for adhering a polyolefin material to other material comprising the steps of:

1) applying a first primer which comprises
   i) a resin comprising at least one backbone selected from the group consisting of hydrocarbon chains and polybutadiene chains, and
   ii) at least one compound selected from the group consisting of polyisocyanate compounds and alkoxysilane compounds, to the surface of a polyolefin material, 2) applying a second primer which comprises
   a) at least one compound selected from the group consisting of poyisocyanate compounds and alkoxysilane compounds, and
   b) optionally at least one resinous compound selected from the group consisting of polyurethane resins, acrylic resins, polyester resins, epoxy resins, ethylene-vinyl acetate copolymers and chlorinated rubbers,
onto the layer of said first primer, and 3) adhering the surface of the polyolefin material to which the first and second primers are applied to other material using a moisture-curing polyurethane adhesive.

DETAILED DESCRIPTION OF THE INVENTION

The first primer used in the method of the present invention comprises
   i) a resin comprising at least one backbone selected from the group consisting of hydrocarbon chains and polybutadiene chains, and
   ii) at least one compound selected from the group consisting of polyisocyanate compounds and alkoxysilane compounds, and optionally an organic solvent.

In general, the amount of the compound ii) is from 1 to 500 wt. parts, preferably from 5 to 300 wt. parts, per 100 wt. parts of the resin i).

Specific examples of the resin i) include polybutadiene resins, hydrogenated polybutadiene resins, SEBS resins (styrene-ethylene-butadiene-styrene block copolymers), hydrogenated SEBS resins, etc.

Specific examples of polyisocyanate compounds include aromatic polyisocyanates (e.g. tolylene diisocyanate, 4,4'-diphenylmethane diisocyanate, xylylene diisocyanate, tolidine diisocyanate, etc.), alicyclic polyisocyanates (e.g. dicyclohexylmethane diisocyanate, isophorone diisocyanate, isopropylidene bis(4-cyclohexylisocyanate), hydrogenated xylylene diisocyanate, cyclohexyl diisocyanate, etc.), aliphatic polyisocyanates (e.g. hexamethylene diisocyanate, lysine diisocyanate, 2,2,4- and 2,4,4-trimethylhexamethylene diisocyanate, etc.), and the like.

Specific examples of alkoxysilane compounds include alkoxysilane compounds having a mercapto group (e.g. γ-mercaptopropylmethyldiethoxysilane, γ-mercaptopropyltrimethoxysilane, γ-mercaptopropylmethyldimethoxysilane, γ-mercaptopropyltriethoxysilane, etc.), alkoxysilane compounds having a primary or secondary amino group (e.g. γ-aminopropylmethyldiethoxysilane, γ-aminopropylmethyldimethoxysilane, γ-aminopropyltrimethoxysilane, γ-aminopropyltriethoxysilane, N-(β-aminoethyl)-N'-(γ-trimethoxysilylpropyl)-ethylenediamine, N-(β-aminoethyl)-γ-aminopropyltrimethoxysilane, N-(β-aminoethyl)-γ-aminopropylmethyldiethoxysilane, N-(γ-aminoethyl)-γ-aminopropylmethyldimethoxysilane, N-(γ-aminoethyl)-γ-aminopropyltriethoxysilane, 1,3-diaminoisopropyltrimethoxysilane, γ-N-phenylaminopropyltrimethoxysilane, γ-N-phenylaminopropyltriethoxysilane, bis(trimethoxysilylpropyl)amine, etc.), alkoxysilane compounds having an epoxy group (e.g.

γ-glycidoxypropyltrimethoxysilane, γ-glycidoxypropylmethyldimethoxysilane, 3,4-epoxycyclohexylethyltrimethoxysilane, 3,4-epoxycyclohexylethylmethyldimethoxysilane, γ-glycidoxypropylmethyldiisopropenoxysilane, etc.), alkoxysilane compounds having an isocyanate group (e.g. γ-isocyanatepropylmethyldiethoxysilane, γ-isocyanatepropylmethyldimethoxysilane, γ-isocyanatepropyltrimethoxysilane, γ-isocyanatepropyltriethoxysilane, etc.), and the like.

Examples of optionally used organic solvents include ketones (e.g. methyl ethyl ketone, acetone, etc.), esters (e.g. ethyl acetate, butyl acetate, etc.), ethers (e.g. ethyl ether, tetrahydrofuran, dioxane, etc.), aromatic compounds (e.g. benzene, toluene, etc.), chlorohydrocarbons (e.g. methylene chloride, etc.), and the like.

The first primer may optionally contain additives, for example, film-forming materials (e.g. acrylic resins, polyester resins, epoxy resins, etc.), inorganic pigments (e.g. carbonblack, titanium white (titanium dioxide pigment), redoxide, Titan Yellow, zinc oxide, red lead, cobalt blue, etc.), organic dyes orpigments (e.g. NEOZABON BLACK RE, NEOBLACK RE, NEOSOL BLACK CN, NEOSOL BLACK Ba (all available from Ciba-Geigy, now Novartis), SEVRON BLUE (available from Hodogaya Chemical Co., Ltd.), etc.), and catalyst (e.g. dibutyltin dilaurate, diocytyltin dilaurate, lead octylate, etc.).

These additives may be contained in conventional amounts.

The first primer may contribute to the provision of adhesion properties to a polyolefin material.

The resin i) may be one having an active hydrogen-containing group (e.g. a hydroxyl group, an amino group, an epoxy group, a carboxyl group, etc.), which can impart a reactivity to the resin. In such a case, the resin may be used in the form of a urethane prepolymer having a terminal isocyanate group which is obtained by reacting a hydrogenated polybutadiene resin having two hydroxyl groups in a molecule (the component i), namely, hydrogenated polybutadiene glycol with an excessive amount of a polyisocyanate (the component ii); a urethane prepolymer having an alkoxysilyl group which is obtained by addition reacting an alkoxysilane compound having a functional group reactive with an isocyanate group (the component ii), for example, an alkoxysilane compound having a mercapto group or a primary or secondary amino group with the above urethane prepolymer having a terminal isocyanate group; or a prepolymer having a terminal alkoxysilyl group which is obtained by reacting hydrogenated polybutadiene glycol with an excessive amount of an alkoxysilane compound having an isocyanate group. Accordingly, the components i) and ii) may be used in the form of a reaction product of them.

The second primer used in the method of the present invention comprises a) at least one compound selected from the group consisting of polyisocyanate compounds and alkoxysilane compounds, b) optionally at least one resinous compound selected from the group consisting of polyurethane resins, acrylic resins, polyester resins, epoxy resins, ethylene-vinyl acetate copolymers and chlorinated rubbers, and optionally an organic solvent which may be the same as that used in the first primer.

Specific examples of polyisocyanate compounds contained in the second primer include triphenylmethane triisocyanate, tris(4-isosyanatephenyl) thiophosphate, reaction products of tolylene diisocyanate and trimethylolpropane, lysine ester triisocyanate, hexamethylene triisocyanate, and the like.

Examples of alkoxysilane compounds may be the same as those exemplified in connection with the first primer.

Polyurethane resins, acrylic resins, polyester resins, epoxy resins, ethylene-vinyl acetate copolymers and chlorinated rubbers may be any of conventional ones.

Furthermore, the second primer may contain any additives that can be the same as those exemplified in connection with the first primer.

The resinous compound b) functions as a film-forming material.

The amount of the resinous compound b) is from 0 to 100 wt. parts per 100 wt. parts of the compound a).

The second primer comprising the above component(s) may prevent the migration of a plasticizer which is contained in a moisture-curing polyurethane adhesive, and also contribute to the prolongation of a working life after the application of the primers.

A moisture-curing polyurethane adhesives used in the method of the present invention comprises a reaction product of a polyol component with an excessive amount of a polyisocyanate component, and optionally suitable amounts of additives.

Specific examples of polyol components include polyether polyol, polyester polyol, polybutadiene polyol, isoprene polyol, hydrogenated isoprene polyol, acrylic polyol, derivatives of castor oil, derivatives of tall oil, and the like.

Specific examples of polyisocyanate components include trimethylene diisocyanate, tetrametylene diisocyanate, hexamethylene diisocyanate, pentamethyelne diisocyanate, 2,2,4- or 2,4,4-trimethylhexamethylene diisocyanate, dodecamethylene diisocyanate, 1,3-cyclopentane diisocyanate, 1,4-cyclohexane diisocyanate, 1,3-cyclohexane diisocyanate, 4,4'-methylene bis (cyclohexylisocyanate), methyl 2,4-cyclohexane diisocyanate, methyl 2,6-cyclohexane diisocyanate, 1,4-bis(isocyanatemethyl)cyclohexane, 1,3-bis(isocyanatemethyl)cyclohexane, m-phenylene diisocyanate, p-phenyhlene diisocyanate, 4,4'-diphenyl diisocyanate, 1,5-naphthalene diisocyanate, 4,4'-diphenylmethane diisocyanate, crude diphenylmethane diisocyanate, 2,4- or 2, 6-tolylene diisocyahate, 4,4'-toluidine diisocyanate, dianiline diisocyanate, 4,4'-diphenylether diisocyanate, 1,3- or 1,4-xylylene diisocyanate, ω,ω'-diisocyanate-1,4-diethylbenzene, and the like.

Additives to the polyurethane adhesive may be fillers, plasticizers, solvents, anti-aging agents, pigments, and the like.

The adhering method of the present invention can be performed as follows:

1) Firstly, the surface of a polyolefin material (e.g. polypropylene (PP), ethylene-propylene-diene copolymer (EPDM), modified PP, modified polyethylene (PE), PP composites, etc.) is wiped with organic solvents, if desired. Examples of organic solvents are aromatic hydrocarbons (e.g. toluene, xylene, etc.), aliphatic hydrocarbons (e.g. n-hexane, n-octane, etc.). Then, the first primer is applied and dried at room temperature.

The dry thickness of the first primer is usually from 0.1 to 20 μm, preferably from 0.5 to 15 μm.

The polyolefin material is preferably heated at a temperature of 60 to 120° C. before or after the application of the first primer. This heating treatment will enhance the adhesion of the primer to the polyolefin material.

2) Next, the second primer is applied to the surface of the layer of the dried first primer. The dry thickness of the second primer is usually from 1 to 40 μm, preferably from 2 to 20 μm. In this step, the same or different second primers may be applied twice or more. Then, the applied second primer is dried at room temperature.

When the applied primers are maintained for an open time of 7 days or longer, the priming properties do not deteriorate. That is, the working life after the application of primers can be prolonged. Thus, polyolefin materials to which the first and second primers are applied can be stored within the limit of a working life, and then an adhesive can be applied prior to the use of the polyolefin materials. Accordingly, the efficiency of the adhering process can be increased.

3) Finally, a moisture-curing polyurethane adhesive is applied to the second primer layer, and the polyolefin material is adhered to other material, and aged at room temperature to cure the adhesive.

EXAMPLES

The present invention will be illustrated by the following examples, in which "%" and "parts" are by weight unless otherwise indicated.

Preparation Example 1

Preparation of a First Primer

One hundred grams of the 20% solution of hydrogenated polybutadiene glycol in toluene and 40 grams of the 20% solution of 4,4'-diphenylmethane diisocyanate were mixed and reacted at 50° C. for 8 hours. Thus, a urethane prepolymer having a terminal isocyanate group was obtained. Then, 20 grams of the 50% solution of an acrylic resin (Acryloid AU 1033 available from Rohm and Haas) as a film-forming material in xylene was added to the above reaction mixture, and a first primer was obtained.

Preparation Example 2

Preparation of a Second Primer

Fifty grams of the 30% solution of a polyester resin (PANDEX T-5205 available from DAINIPPON INK AND CHEMICALS, INC.) in ethyl acetate was added to 100 grams of the 27% solution of tris(4-isocyanatephenyl) thiophosphate in ethyl acetate (DESMODULE® RFE available from BAYER AG), and stirred. Thus, a second primer was obtained.

Example 1

The surface of a polypropylene sheet was wiped with a cloth impregnated with toluene. Then, the first primer prepared in Preparation Example 1 was applied in an amount of 30 g/m², and dried at room temperature for 10 minutes.

Thereafter, the second primer prepared in Preparation Example 2 was applied in an amount of 30 g/m², and dried at room temperature for 10 minutes.

After the application and drying of the second primer, a moisture-curing polyurethane adhesive (PENGUINE SEAL #556 manufactured by SUNSTAR GIKEN KABUSHIKI KAISHA) was applied in the form of a bead having a thickness of 5 mm and a width of 10 mm, and aged to cure at room temperature for 7 days.

The adhesion test (by hand) was carried out by peeling off the bead of the cured adhesive under the following conditions:

Original adhesion: Just after aging.
Heat resistant adhesion: After heating a sample at 90° C. for 7 days following aging.
Water resistant adhesion: After maintaining a sample in water at 40° C. for 7 days following aging.

The results are shown in the Table.

Example 2

A sample was prepared and subjected to the adhesion test in the samemanner as in Example 1 except that a polyolefin-material was maintained at room temperature for 7 days (open time) after the application of the second primer prior to the application of the adhesive. The results are shown in the Table.

Comparative Example 1

A sample was prepared and subjected to the adhesion test in the same manner as in Example 1 except that no second primer was applied. The results are shown in the Table.

Comparative Example 2

A sample was prepared and subjected to the adhesion test in the same manner as in Example 1 except that no first primer was applied. The results are shown in the Table.

TABLE

|  | Ex. 1 | Ex. 2 | C. Ex. 1 | C. Ex. 2 |
| --- | --- | --- | --- | --- |
| Original adhesion | CF | CF | CF | AF |
| Heat resistant adhesion | CF | CF | AF | AF |
| Water resistant adhesion | CF | CF | CF/AF | AF |

Note:
CF: Cohesive failure of an adhesive.
AF: Adhesive failure between a polyolefin material and a first primer layer.

Preparation Example 3

γ-Glycidylpropyltrimethoxysilane (15 g), N-β-(aminoethyl)-γ-aminopropyltrimethoxysilane (7.2 g) were reacted in absolute methyl ethyl ketone (22.2 g) at 50° C. for 24 hours. Then, the 50% solution of an acrylic resin (Acryloid AU 1033 available from Rhom and Haas) (12 g) and an epoxy resin (EPIKOTE #1007 available from YUKA SHELL EPOXY Co., Ltd.) (12 g) were added to the reaction mixture, followed by the addition of methyl ethyl ketone (45 g). Thus, a silane base second primer was obtained.

Example 3

A sample was prepared and subjected to the adhesion test in the same manner as in Example 1 except that the second primer prepared in Preparation Example 3 was used in place of the second primer prepared in Preparation Example 2.

Example 4

A sample was prepared and subjected to the adhesion test in the same manner as in Example 2 except that the second primer prepared in Preparation Example 3 was used in place of the second primer prepared in Preparation Example 2.

The samples of Examples 3 and 4 had good adhesion properties like those of Examples 1 and 2.

As can be seen from the results in Examples and Comparative Examples, the samples of Examples 1 to 4 had good adhesion properties unlike those of Comparative Examples 1 and 2. Furthermore, the adhering method of the present invention could provide the adhered samples having good adhesion properties even when a long open time was set after the application of the primers as in Examples 2 and 4.

That is, the results of Examples 2 and 4 confirmed that a long working life was attained after the application of the primers.

What is claimed is:

1. A method for adhering a polyolefin material to other material comprising the steps of:
   1) applying a first primer which comprises
      i) a resin comprising at least one backbone selected from the group consisting of hydrocarbon chains and polybutadiene chains, and
      ii) at least one compound selected from the group consisting of polyisocyanate compounds and alkoxysilane compounds, to the surface of a polyolefin material,
   2) applying a second primer which comprises
      a) at least one compound selected from the group consisting of polyisocyanate compounds and alkoxysilane compounds, and
      b) optionally at least one resinous compound selected from the group consisting of polyurethane resins, acrylic resins, polyester resins, epoxy resins, ethylene-vinyl acetate copolymers and chlorinated rubbers,
   onto the layer of said first primer, and
   3) adhering the surface of the polyolefin material to which the first and second primers are applied to other material using a moisture-curing polyurethane adhesive.

2. A method according to claim 1, wherein the other material is window glass of an automobile and said polyolefin material is a window molding which is mounted on the periphery of the window glass.

3. A method according to claim 1, wherein said first primer is at least one compound selected from the group consisting of a urethane prepolymer having a terminal isocyanate group which is obtained by reacting hydrogenated polybutadiene glycol with an excessive amount of a polyisocyanate; a urethane prepolymer having an alkoxysilyl group which is obtained by addition reacting an alkoxysilane compound having a functional group reactive with an isocyanate group with said urethane prepolymer having a terminal isocyanate group; and a prepolymer having a terminal alkoxysilyl group which is obtained by reacting hydrogenated polybutadiene glycol with an excessive amount of an alkoxysilane compound having an isocyanate group.

4. A method according to claim 1, wherein the surface of said polyolefin material, which is to be adhered, is wiped with an organic solvent prior to the application of the first primer.

5. A method according to claim 1, wherein the surface of said polyolefin material, which is to be adhered, is heated before or after the application of the first primer.

* * * * *